United States Patent
Umapathy et al.

(10) Patent No.: US 12,418,696 B1
(45) Date of Patent: Sep. 16, 2025

(54) ACTION ORIENTED DETECTION OF SYNTHETIC MEDIA OBJECTS

(71) Applicant: Bank of America Corporation, Charlotte, NC (US)

(72) Inventors: Sivasundaram Umapathy, Chennai (IN); Prasanth Kaliyangad, Chennai (IN); Nagalakshmi Tirumalaikumar, Chennai (IN); Manikandan Selvaraj, Chennai (IN); Dharmendra Golkonda, Chennai (IN); Venkatesh Sivaraman, Chennai (IN); Vikas Shriniwas Shahapure, Secunderabad (IN); Sundarrajan Raman, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 810 days.

(21) Appl. No.: 17/654,018

(22) Filed: Mar. 8, 2022

(51) Int. Cl.
| | |
|---|---|
| H04N 21/44 | (2011.01) |
| G06V 10/40 | (2022.01) |
| G06V 40/40 | (2022.01) |

(52) U.S. Cl.
CPC ....... *H04N 21/44008* (2013.01); *G06V 10/40* (2022.01); *G06V 40/40* (2022.01)

(58) Field of Classification Search
CPC .. H04N 21/44008; H04N 21/44; H04N 21/43; H04N 21/40; G06V 10/40; G06V 40/40
See application file for complete search history.

(56) References Cited

U.S. PATENT DOCUMENTS

| | | | |
|---|---|---|---|
| 5,842,191 A | 11/1998 | Stearns | |
| 9,659,185 B2 | 5/2017 | Elovici et al. | |

(Continued)

FOREIGN PATENT DOCUMENTS

| | | | | |
|---|---|---|---|---|
| CN | 113469085 A | * | 10/2021 | ............. G06V 10/62 |
| WO | WO-2021095044 A1 | * | 5/2021 | ............ G06F 21/552 |

OTHER PUBLICATIONS

Meng Li; Beibei Liu; Yongjian Hu; Yufei Wang, Exposing Deepfake Videos by Tracking Eye Movements, May 5, 2021, IEEE, 2020 25th International Conference on Pattern Recognition (ICPR) (Year: 2021).*

(Continued)

*Primary Examiner* — Andrew M Moyer
*Assistant Examiner* — Conor A O'Malley (57) ABSTRACT

A synthetic media detection system stores, for each of a set of predefined objects an object repository with previously determined characteristics of predefined objects and an action description repository with natural language descriptions of actions that are known to be possible to occur with the predefined object. The system receives at least a portion of a media stream including a video to be presented on a media player device. An object is detected in the received portion of the media stream and properties of the detected object are determined. An action is determined that is associated with the detected object. An object probability is determined that the detected object is a synthetic media object. A chronological description is determined of the actions associated with the detected object. An overall probability that the object is synthetic media object using the chronological description is determined and displayed with the video.

20 Claims, 2 Drawing Sheets

(56) References Cited

U.S. PATENT DOCUMENTS

| | | | |
|---|---|---|---|
| 10,262,236 B2 | 4/2019 | Lim et al. | |
| 11,170,064 B2* | 11/2021 | David | H04L 51/10 |
| 11,594,032 B1* | 2/2023 | Raman | H04N 21/8352 |
| 2004/0131254 A1 | 7/2004 | Liang et al. | |
| 2007/0011711 A1 | 1/2007 | Wolf et al. | |
| 2011/0317009 A1 | 12/2011 | Kumaraswamy et al. | |
| 2014/0250457 A1 | 9/2014 | Ramaswamy | |
| 2014/0363799 A1* | 12/2014 | Brown | G09B 5/065 |
| | | | 434/247 |
| 2015/0256835 A1 | 9/2015 | Sakai | |
| 2016/0004914 A1 | 1/2016 | Park | |
| 2016/0019426 A1 | 1/2016 | Tusch et al. | |
| 2017/0185829 A1 | 6/2017 | Walsh et al. | |
| 2017/0223310 A1* | 8/2017 | Farrell | G06V 20/46 |
| 2017/0311863 A1 | 11/2017 | Matsunaga | |
| 2018/0114017 A1 | 4/2018 | Leitner et al. | |
| 2018/0225518 A1 | 8/2018 | Gu et al. | |
| 2018/0268222 A1 | 9/2018 | Sohn et al. | |
| 2018/0316890 A1 | 11/2018 | Farrell et al. | |
| 2018/0341878 A1 | 11/2018 | Azout et al. | |
| 2019/0029528 A1 | 1/2019 | Tzvieli et al. | |
| 2019/0046044 A1 | 2/2019 | Tzvieli et al. | |
| 2019/0052839 A1 | 2/2019 | Farrell et al. | |
| 2019/0073523 A1 | 3/2019 | Lee et al. | |
| 2019/0122072 A1 | 4/2019 | Cricri et al. | |
| 2019/0147333 A1 | 5/2019 | Kallur Palli Kumar et al. | |
| 2019/0164173 A1 | 5/2019 | Liu et al. | |
| 2019/0179861 A1 | 6/2019 | Goldenstein et al. | |
| 2019/0213720 A1 | 7/2019 | Urashita | |
| 2019/0213721 A1 | 7/2019 | Urashita | |
| 2019/0236614 A1 | 8/2019 | Burgin et al. | |
| 2019/0258870 A1* | 8/2019 | Kundu | G06V 20/41 |
| 2019/0278378 A1 | 9/2019 | Yan et al. | |
| 2019/0290127 A1 | 9/2019 | Hanina et al. | |
| 2019/0290129 A1 | 9/2019 | Hanina et al. | |
| 2019/0303655 A1* | 10/2019 | Werner | G09B 5/00 |
| 2019/0313915 A1 | 10/2019 | Tzvieli et al. | |
| 2019/0347388 A1* | 11/2019 | Jiang | G06V 10/82 |
| 2019/0349613 A1* | 11/2019 | Pikes | H04N 21/4542 |
| 2019/0354765 A1* | 11/2019 | Chan | H04N 21/2187 |
| 2019/0355128 A1 | 11/2019 | Grauman et al. | |
| 2020/0074183 A1* | 3/2020 | Altuev | G06T 7/20 |
| 2020/0092301 A1* | 3/2020 | Coffing | H04L 63/12 |
| 2020/0379715 A1* | 12/2020 | Won | G06F 3/04883 |
| 2021/0406568 A1* | 12/2021 | Liberman | G06Q 20/3821 |
| 2022/0004904 A1* | 1/2022 | Stemmer | G06F 18/2148 |
| 2022/0244975 A1* | 8/2022 | Begert | G06F 11/3664 |
| 2022/0269922 A1* | 8/2022 | Mathews | G06V 20/46 |
| 2023/0252808 A1* | 8/2023 | Markhasin | G06V 10/764 |
| | | | 382/224 |

OTHER PUBLICATIONS

Raman, S., "Media Player and Video Verification System," U.S. Appl. No. 17/177,451, filed Feb. 17, 2021, 38 pages.

Raman, S., "Automated Video Verification," U.S. Appl. No. 17/177,659, filed Feb. 17, 2021, 38 pages.

* cited by examiner

ACTION ORIENTED DETECTION OF SYNTHETIC MEDIA OBJECTS

TECHNICAL FIELD

The present disclosure relates generally to synthetic media. More particularly, in certain embodiments, the present disclosure is related to action oriented detection of synthetic media objects.

BACKGROUND

Synthetic media, such as so called "deepfake" videos, can be generated to mislead media consumers. For instance, a video of an individual speaking can be edited or generated to make it appear as though a person has spoken words that they did not actually speak and/or performed actions they did not actually perform.

SUMMARY

Synthetic media is becoming increasingly realistic and difficult to recognize. Humans are generally unable to reliably identify images and videos that contain synthetic media. It is difficult to reliably and efficiently detecting synthetic media and effectively informing users that they are potentially viewing synthetic media. This disclosure recognizes that previous tools fail to provide for the detection of synthetic objects in media, such as any item or other object that may be artificially added to a video or image to create a scenario that did not occur in the real world. For example, previous technology fails to provide efficient and reliable tools for detecting synthetic media in which an object is artificially added or otherwise modified.

Certain embodiments of this disclosure are integrated into the practical application of an action-based synthetic media detection system that provides unique solutions to technical problems of previous technology, including those described above, by efficiently and reliably detecting synthetic objects in media. For example, the disclosed system provides several technical advantages which may include 1) the efficient and reliable detection of synthetic objects in media based at least in part on actions occurring with or around the objects; 2) the automatic implementation of a two-prong probability determination that not only accounts for the appearance of objects in images but also evaluates an automatically generated description of an object's actions to determine a more reliable assessment of synthetic media than was previously possible; and 3) the presentation of a dynamically updated indicator of the probability that displayed media includes a synthetic media object. As such, this disclosure may improve the function of computer systems used to present media, detect synthetic media, and/or report the presence of suspected synthetic media. For example, the system described in this disclosure may decrease processing resources required to review media and improve the reliability of the results of this review (e.g., by adjusting the frequency of media stream sampling based on a current synthetic media probability level in certain embodiments).

Certain embodiments of this disclosure may include some, all, or none of these advantages. These advantages and other features will be more clearly understood from the following detailed description taken in conjunction with the accompanying drawings and claims.

In an embodiment, a synthetic media detection system stores, for each of a set of predefined objects, (1) an object repository with previously determined characteristics of predefined objects and (2) an action description repository with natural language descriptions of actions that are known to be possible to occur with the predefined object. The synthetic media detection system receives at least a portion of a media stream that includes a video to be presented on a media player device. An object is detected in the received portion of the media stream. Properties of the detected object are determined. An action is determined that is associated with the detected object. An object probability is determined that the detected object is a synthetic media object that is artificially included in the video based on a comparison of the properties of the detected object to the previously determined characteristics of predefined objects of the object repository. A chronological description is determined of the actions associated with the detected object. An overall probability that the detected object is the synthetic media object is determined based on whether the chronological description includes actions that can occur with the detected object. The media presentation device displays the overall probability along with the video.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, prior to this disclosure, there was a lack of tools for reliably detecting synthetic media objects and presenting results of this detection. The system described in this disclosure solves technical problems of previous technology by detecting synthetic media objects using an action-oriented approach. The system also facilitates the presentation of a dynamically determined probability that viewed media includes synthetic media.

As used in this disclosure, media generally refers to video, images, and/or audio content. However, media encompasses any other appropriate media which may be shared and/or distributed in a digital format. An example of media for a subject is a video of the subject speaking. As used in this disclosure, "real media" refers to media that depicts (e.g., is a recording or other representation of) the subject without any adulteration to the information provided in the media. For example, a "real" video of a subject may be an audio-visual recording of the subject speaking. As used in this disclosure, "synthetic media" refers to media which has been edited to attribute actions and/or words to a subject that were not performed/spoken by the subject. For example, a "synthetic" video may include an edited version of a "real" video of the subject speaking which has been created or edited to show the subject speaking words that were not actually spoken by the subject in the real video.

System for Synthetic Media Detection and Reporting

Figure 1:
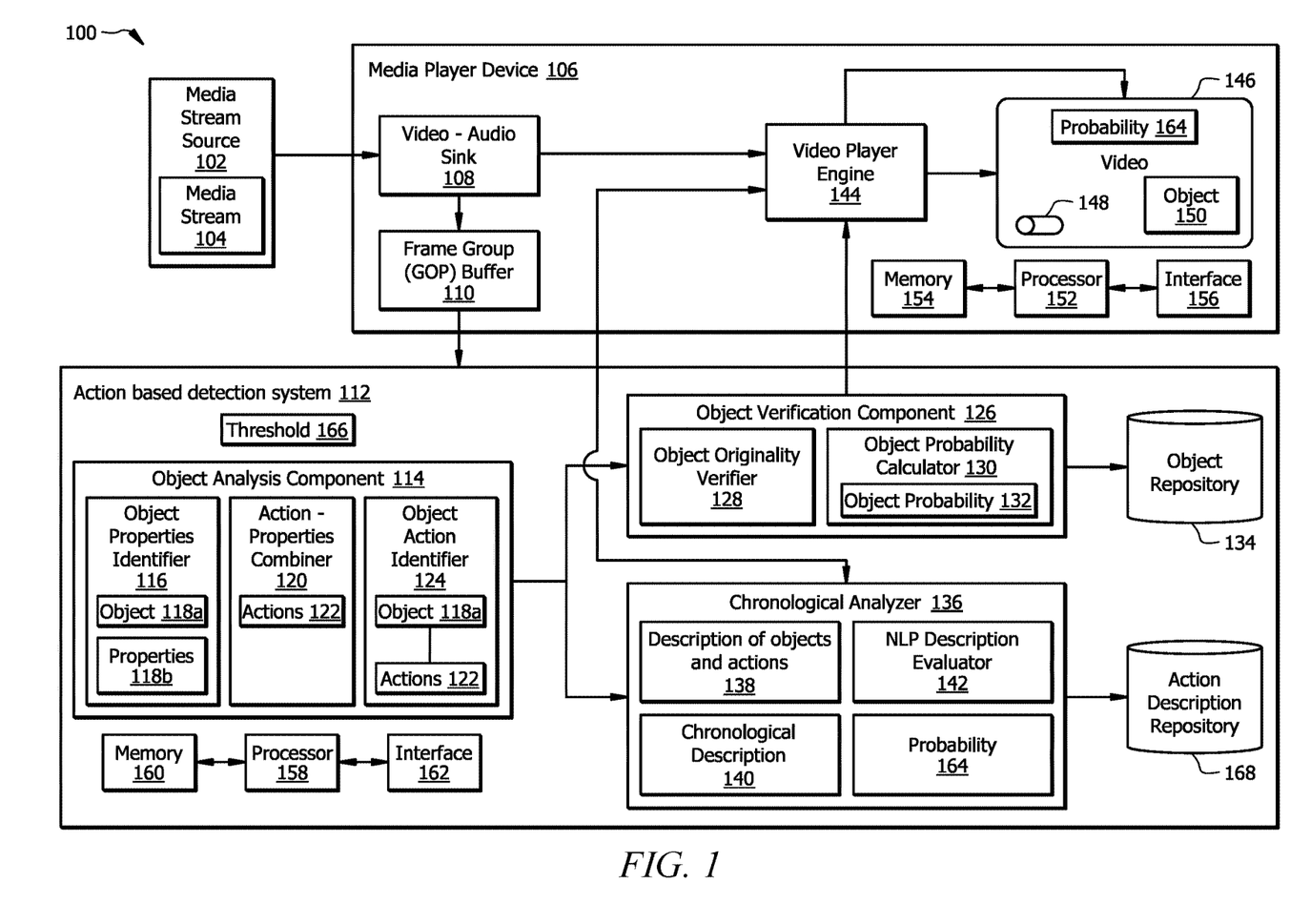
FIG. 1 is a schematic diagram of an example synthetic media detection system.

FIG. 1 is a schematic diagram of an example system 100 for detecting potential synthetic media in a media stream 104. The system 100 includes one or more media stream sources 102, a media player device 106, and an action-based detection system 112. The one or more media stream sources 102 generally include any source(s) of a media stream 104, such as a server, data store, or database. For instance, the media stream 104 may be provided or retrieved over a network from a server media stream source 102 configured to host the media stream 104. The media stream 104 may include any type of media such as one or more videos 146 (e.g., audio-visual recordings), audio recordings, images, and the like. For example, the media stream 104 may include an audio-visual recording or video that includes an object 150.

The media player device 106 is generally any device operable to receive the media stream 104 and display a video 146 included in the media stream 104. The media player device 106 includes a video-audio sink 108 and a video player engine 144. The media player device 106 and its various components 108, 144 may be implemented using processor 152, memory 154, and device network interface 156 described further below. The video-audio sink 108 uses memory 154 of the media player device 106 to store, at least temporarily, the media stream 104 as it is received. The video-audio sink 108 provides the media stream 104 to the video player engine 144 and provides at least a portion of the media stream 104 as frame group buffer 110 to the action-based detection system 112. The video-audio sink 108 may temporarily delay provisioning of the media stream 104 to the video player engine 144, such that operations of the action-based detection system 112 may be performed to determine an overall probability 164 that the media stream 104 includes synthetic media before the video 146 is displayed. The frame group buffer 110 may be stored in memory 154 of the media player device 106 as a portion of image frames of the media stream 104.

The frame group buffer 110 of the media stream 104 is selected and provided to the action-based detection system 112, which uses this information to determine an overall probability 164 that the object 150 appearing in video 146 is a synthetic media object (as described in greater detail below). In some embodiments, the amount of information or the frequency of information provided in the frame group buffer 110 is adjusted based on a previous overall probability 164 determined by the action-based detection system 112. For example, when the previous overall probability 164 that an object 150 is synthetic media is low, then the amount of data sent in the frame group buffer 110 may decreased to a predefined low level (e.g., of a certain number of image frames per unit of time). However, when the overall probability 164 exceeds a threshold 166 (e.g., a threshold value), the amount of data sent in the frame group buffer 110 may be increased to increase the reliability and better refine the evaluations performed by the action-based detection system 112.

The video player engine 144 of the media player device 106 receives the media stream 104 and the synthetic media overall probability 164 and displays both. For example, the video player engine 144 may display the media stream 104 as displayed video 146 with an overlay of the synthetic media overall probability 164. Thus, the media player device 106 includes the technical improvement of a dynamically updated indicator of the overall probability 164 that displayed video 146 includes an object 150 that is synthetic media (e.g., that did not originally appear in the video 146 and/or did not behave in the real world as depicted in the video 146). The object 150 may be highlighted in the video 146 (e.g., by a circle or box around the object or any other appropriate visual cue) to indicate that the overall probability 164 corresponds to the likelihood that the particular object 150 was added/modified as synthetic media to the video 146. In some embodiments, the synthetic media overall probability 164 is added as a watermark to the displayed video 146.

In some embodiments, a toggle button 148 or other option field may be presented in or around the displayed video 146 in order for a user to request that the overall probability 164 be presented or hidden. As such, the video media player device 106 may receive a user input based on operation of the toggle button 148, determine if the user input corresponds to a request to display or hide the overall probability 164, and either display or hide the overall probability 164 based on this request. In some cases, the overall probability 164 is only determined by the action-based detection system 112 if a user requests display of the overall probability 164, thereby conserving processing resources of the action-based detection system 112. In other cases, the overall probability 164 is determined even when display of the overall probability 164 is not currently requested (e.g., but optionally at a lower rate of acquisition of the frame group buffer 110 to partially decrease computational costs). This allows the overall probability 164 to be immediately available for display when such display is requested via toggle button 148. When display is requested, the frame group buffer 110 may be provided at a higher frequency for improved accuracy of the overall probability 164 over time.

As described above, the media player device 106 includes a processor 152, memory 154, and the device network interface 156. The processor 152 includes one or more processors. The processor 152 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 152 may be a programmable logic device, a microcontroller, a microprocessor, or any suitable combination of the preceding. The processor 152 is communicatively coupled to and in signal communication with the memory 154 and device network interface 156. The one or more processors are configured to process data and may be implemented in hardware and/or software. For example, the processor 152 may be 8-bit, 16-bit, 32-bit, 64-bit or of any other suitable architecture. The processor 152 may include an arithmetic logic unit (ALU) for performing arithmetic and logic operations, processor registers that supply operands to the ALU and store the results of ALU operations, and a control unit that fetches instructions from memory 154 and executes them by directing the coordinated operations of the ALU, registers and other components.

The memory 154 is operable to store any data, instructions, logic, rules, or code operable to execute the functions of the media player device 106. The memory 154 includes one or more disks, tape drives, or solid-state drives, and may be used as an over-flow data storage device, to store programs when such programs are selected for execution, and to store instructions and data that are read during program execution. The memory 154 may be volatile or non-volatile and may comprise read-only memory (ROM), random-access memory (RAM), ternary content-addressable memory (TCAM), dynamic random-access memory (DRAM), and static random-access memory (SRAM).

The device network interface 156 is configured to enable wired and/or wireless communications. The device network interface 156 is configured to communicate data between the media player device 106 and other network devices, systems, or domain(s), such as the media stream source 102 and action-based detection system 112. The device network interface 156 is an electronic circuit that is configured to enable communications between devices. For example, the device network interface 156 may include one or more serial ports (e.g., USB ports or the like) and/or parallel ports (e.g., any type of multi-pin port) for facilitating this communication. As a further example, the device network interface 156 may include a WIFI interface, a local area network (LAN) interface, a wide area network (WAN) interface, a modem, a switch, or a router. The processor 152 is configured to send and receive data using the device network interface 156. The device network interface 156 may be configured to use any suitable type of communication protocol.

The action-based detection system 112 is generally any device or collection of devices operable to determine the overall probability 164 that the object 150 appearing in video 146 is synthetic media. The action-based detection system 112 may be a separate device or collection of devices from the media player device 106 or may be partially or entirely integrated within the media player device 106. For example, all or a portion of the functions of the action-based detection system 112 may be implemented using an external device or server with the separate processor 158, memory 160, and the system network interface 162 described below. In some cases, one or more of the functions of the action-based detection system 112 may be performed by the media player device 106 (e.g., by the processor 152, memory 154, and the device network interface 156 of the media player device 106, described above). Accordingly, in various embodiments, operations described as being performed by the action-based detection system 112 may be performed by the media player device 106 (and vice versa). In some cases, functions requiring more complex computations (e.g., for machine learning algorithms or the like) may be implemented by the separate processor 158, memory 160, and system network interface 162 of the action-based detection system 112, while one or more less computationally costly functions may be executed locally by the media player device 106.

The action-based detection system 112 includes an object analysis component 114, an object verification component 126, and a chronological analyzer 136, each of which may be implemented by the processor 158 executing instructions stored in memory 160. The object analysis component 114 generally identifies objects 118a (e.g., one or more of the objects 150) and object properties 118b of the object(s) 118a appearing in the image frames provided in the frame group buffer 110 along with actions 122 being performed with/by the objects 118a in the video 146. For example, functions of the object analysis component 114 may include tasks illustrated with respect to the object properties identifier 116, action properties combiner 120 and object action identifier 124 of FIG. 1. The object properties identifier 116 generally determines object properties 118b of any objects 118a detected in the video 146 (e.g., in the portion of the video 146 that is sent to the action-based detection system 112 as frame group buffer 110). The object properties 118b may correspond to a name of a corresponding real-world object 118a that is detected in the frame group buffer 110, properties of the object 118a (e.g., size, shape, color, texture, etc.), a class or category of the object 118a (e.g., an object 118a that is a bottle may be a liquid-holding class of object and an object 118a that is a car may be an automobile class of object, etc.), a logo or text appearing on the object 118a, and/or any other information that may be used to identify or characterize the object 118a detected in the video 146. The object properties identifier 116 may employ any appropriate object detection and/or characterization algorithms to detect objects 118a and determine the object properties 118b. Examples of algorithms used for object detection/identification include neural network-based algorithms and the like. For instance, a neural network-based algorithm may employ a convolutional neural network (CNN) that is trained to detect objects 118a and determine object properties 118b based on properties of previously collected images of the objects 118a or similar objects.

The action properties combiner 120 identifies actions 122 appearing in the portion of the video 146 provided in the frame group buffer 110. Examples of actions include moving, rolling, falling, breaking, driving, floating, hovering, or any other action that may be associated with a given object 118a. The action properties combiner 120 may employ any appropriate action detection and/or characterization algorithms to determine the actions 122. Examples of algorithms used for action detection/identification include neural network-based algorithms, such as CNNs, similarly to as described above for object detection.

The object action identifier 124 determines which of the actions 122 are associated with the detected objects 118a and links the actions 122 to the corresponding detected objects 118a. The objects 118a and their properties 118b are used by the object verification component 126 to determine an initial object probability 132 that one or more objects 118a may be synthetic media of a known object based on the appearance of the detected objects 118a. The chronological analyzer 136 is then used to determine a refined (e.g., overall) probability 164 that one or more objects 118a (e.g., object 150 appearing in video 146 in the media player device 106) may be synthetic media, based at least in part on the actions 122 linked to the objects 118a.

The object verification component 126 includes an object originality verifier 128 and an object probability calculator 130. The object verification component 126 is in communication with an object repository 134, which stores previously determined characteristics of predefined objects (e.g., sizes/appearances of known objects, texts/logos appearing on known objects, and the like). The object repository 134 may be stored in the memory 160 of the action-based detection system 112. The object originality verifier 128 determines whether detected objects 118a match, or are similar to, known objects in the object repository 134. The object probability calculator 130 then determines the object probability 132 based on the predefined information in the object repository 134. The initial object probability 132 provides an initial estimate of whether an object 118a is real or synthetic in the media stream 104, based for example, on a comparison of the object properties 118b for a given object 118a to the information for the most similar object in the object repository 134. The object probability 132 may act as a starting point for determining the overall probability 164 by the chronological analyzer 136, as described below.

This disclosure recognizes that relying on information in the object repository 134 alone may result in certain synthetic media going undetected. To reduce the chance that synthetic media is not detected, the chronological analyzer 136 provides an improved determination of an overall probability 164 that accounts for how detected objects 118a behave over time in the video 146. The chronological analyzer 136 may detect synthetic media that is outside the relatively narrow range of predefined information that can be captured in the object repository 134 by determining whether the chronological series of actions 122 occurring for a given object 118a are possible/realistic in the real world. This possibility is determined by comparing an automatically generated chronological, or frame-wise, description 140 of the object 118a and its actions 122 to reference descriptions for that object 118a (or a corresponding class of objects) stored in an action description repository 168.

The chronological analyzer 136 first determines a description 138 of the objects 118a and associated actions 122 as text for each frame (or set of frames) corresponding to a given point in time in the video 146. A machine learning algorithm may be trained to generate the description 138. The description 138 may be in a natural language. As used in this disclosure, a natural language corresponds to an established language (e.g., English) used for human-to-human communication. Descriptions 138 for different times, or frames, are then transformed through appropriate combination into the chronological description 140 of the object's actions 122 over time in the video 146. This chronological description 140 is a narrative of the actions 122 occurring with each detected object 118a throughout the portion of the video 146 that is provided in the frame group buffer 110 for analysis. As such, in some cases, the amount of data provided in the frame group buffer 110 may be adjusted to ensure the narrative of the chronological description 140 is complete enough for reliable analysis. For example, when the object probability 132 is low or a previously determined overall probability 164 is low (e.g., less than a threshold 166), less data may be provided in the frame group buffer 110. However, when there is a need to more accurately determine or verify the presence of a synthetic media object 150 in a video 146, the data included in the frame group buffer 110 may be increased (e.g., when a high value object 118a is detected in a video 146 or when a probability (object probability 132, overall probability 164) is relatively high).

The chronological description 140 is then provided to the natural language processing (NLP) evaluator 142, which compares the chronological description 140 to reference descriptions stored in the action description repository 168 (e.g., which may be stored in memory 160). The action description repository 168 stores natural language descriptions of actions that are known to be possible to occur for the predefined object. These references may indicate actions that are possible and impossible for certain objects 118a or classes of objects 118a. For example, a smartphone class object 118a is capable of falling if dropped but cannot move on its own. This type of information is captured by the action description repository 168 and used for comparison to the chronological description 140.

Based on this comparison, an overall probability 164 is then determined. For example, the comparison may indicate whether the chronological description 140 includes actions 122 for an object 118a that can occur for the object 118a. For example, certain objects may not be capable of independent movement, while other objects are capable of certain types of independent movement. These characteristics are captured by the references in the action description repository 168. If an object 118a is indicated in the chronological description 140 to be making a movement or other action type that is not appropriate for that object 118a, then the overall probability 164 that the object 118a is synthetic media is increased. Any appropriate method of natural language processing and/or an appropriately trained machine learning algorithm may be used to determine the overall probability 164 using information in the action description repository 168.

As illustrated in FIG. 1, the action-based detection system 112 may include a processor 158, memory 160, and system network interface 162. The processor 158 includes one or more processors. The processor 158 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 158 may be a programmable logic device, a microcontroller, a microprocessor, or any suitable combination of the preceding. The processor 158 is communicatively coupled to and in signal communication with the memory 160 and system network interface 162. The one or more processors are configured to process data and may be implemented in hardware and/or software. For example, the processor 158 may be 8-bit, 16-bit, 32-bit, 64-bit or of any other suitable architecture. The processor 158 may include an arithmetic logic unit (ALU) for performing arithmetic and logic operations, processor registers that supply operands to the ALU and store the results of ALU operations, and a control unit that fetches instructions from memory 160 and executes them by directing the coordinated operations of the ALU, registers and other components.

The memory 160 is operable to store any data, instructions, logic, rules, or code operable to execute the functions of the action-based detection system 112. The memory 160 includes one or more disks, tape drives, or solid-state drives, and may be used as an over-flow data storage device, to store programs when such programs are selected for execution, and to store instructions and data that are read during program execution. The memory 160 may be volatile or non-volatile and may comprise read-only memory (ROM), random-access memory (RAM), ternary content-addressable memory (TCAM), dynamic random-access memory (DRAM), and static random-access memory (SRAM).

The system network interface 162 is configured to enable wired and/or wireless communications. The system network interface 162 is configured to communicate data between the action-based detection system 112 and other network devices, systems, or domain(s), such as the media player device 106. The system network interface 162 is an electronic circuit that is configured to enable communications between devices. For example, the system network interface 162 may include one or more serial ports (e.g., USB ports or the like) and/or parallel ports (e.g., any type of multi-pin port) for facilitating this communication. As a further example, the system network interface 162 may include a WIFI interface, a local area network (LAN) interface, a wide area network (WAN) interface, a modem, a switch, or a router. The processor 158 is configured to send and receive data using the system network interface 162. The system network interface 162 may be configured to use any suitable type of communication protocol.

In an example operation of the system 100, a media stream 104 is received by the media player device 106. The media stream 104 includes a video 146 (i.e., an audio-visual recording) that includes an artificially added object 150 (i.e., a synthetic media object 150). In this example, the artificially added object 150 is a smartphone device. The video 146 shows an individual dropping the device from a modest height and the screen of the device shattering. The video-audio sink 108 of the media player device 106 temporarily stores the media stream 104 as it is received and passes a portion of the media stream 104 to the action-based detection system 112 as frame group buffer 110. Initially, the frame group buffer 110 is provide at a predefined data frequency that is subsequently updated based on determined values of the overall probability 164.

The action-based detection system 112 identifies a set of objects 118a appearing in the video 146 and actions 122 associated with the objects 118a. In this example, one detected object 118a is the smartphone device. Actions 122 that are determined for the object 118a are falling from the height, briefly floating above the ground, and breaking soon after hitting the ground. Object properties 118b are used to determine an object probability 132 that is relatively low, indicating that the object 118a appears, based on the object properties 118b, to be a real smartphone device. However, the chronological analyzer 136 determines a relatively high overall probability 164 that the smartphone device object 118a is synthetic media because the brief floating action 122 is not possible in the real world for the smartphone class of object.

The overall probability 164 is presented along with the video 146. The object 150 in the video 146 may also be flagged (e.g., by a bounding box or other visual indicator) to indicate that the object 150 is associated with the relatively high overall probability 164 of synthetic media. As such, in this example operation, a user viewing the video 146 is informed that the smartphone device depicted as object 150 likely did not really break from the fall despite the video 146 providing a realistic and otherwise seemingly believable presentation of this scenario.

Example Method of Detecting Synthetic Media Objects

Figure 2:
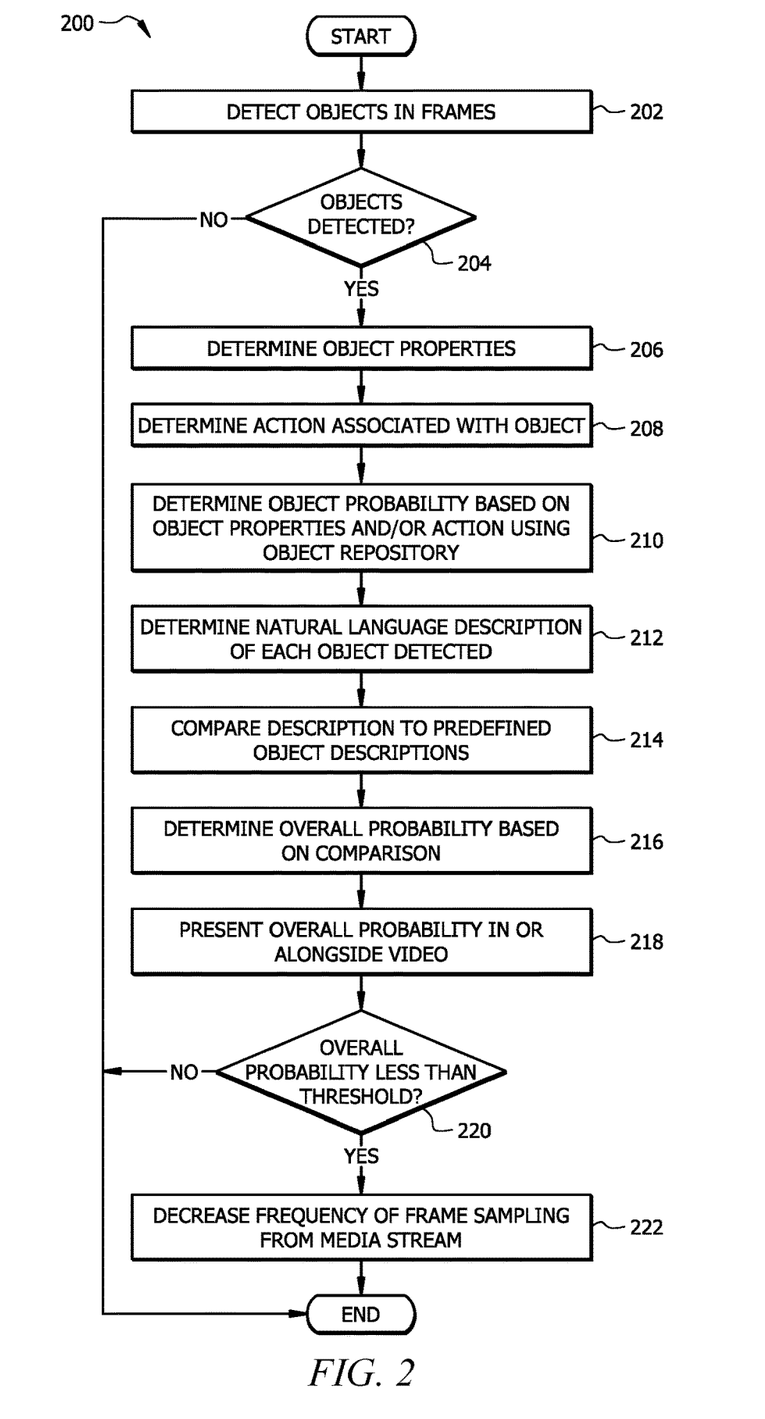
FIG. 2 is a flowchart illustrating an example method of operating the system of FIG. 1.

FIG. 2 is a flowchart of an example method 200 for operating the system 100 of FIG. 1. The method 200 generally facilitates the determination of an overall probability 164 that a media stream 104 or video 146 includes synthetic media of an object 150 and the automatic display of this overall probability 164. The method 200 may be performed by the processor 158, memory 160, and the system network interface 162 of the action-based detection system 112 and/or the processor 152, memory 154, and the device network interface 156 of the media player device 106. The method 200 may begin at step 202 where one or more objects 118a are detected in the video 146 (e.g., in the portion of the video 146 provided in the frame group buffer 110). The action-based detection system 112 may receive at least a portion of a media stream comprising a video to be presented on the media player device 106 and detect object (s) 118a in the portion received, for example, as described with respect to the object analysis component 114 of FIG. 1. At step 204, the action-based detection system 112 determines whether at least one object 118a is detected. If at least one object 118a is detected, the action-based detection system 112 proceeds to step 206.

At step 206, object properties 118b are determined for each detected object 118a. The object properties 118b generally describe features of the detected objects 118a, such as size (e.g., length, width, height, apparent volume, etc.) of the detected objects 118a, color of the detected objects 118a, a logo appearing on the detected objects 118a, text appearing on the detected object 118a, an object class of the detected objects 118a, and the like. The object properties 118b may be determined as described above with respect to the object analysis component 114 of FIG. 1.

At step 208, the action-based detection system 112 determines one or more actions 122 associated with each detected object 118a. Examples of actions 122 include moving, rolling, falling, breaking, driving, floating, hovering, or any other action that may be associated with a given object 118a. Any appropriate action detection and/or characterization algorithm(s) may be used to determine the object properties 118, as described above with respect to the example of the object analysis component 114 of FIG. 1.

At step 210, an object probability 132 is determined for each detected object 118a. The object probability 132 corresponds to an initial percentage likelihood that the object 118a is a synthetic media object that has been artificially included in the video 146. The object probability 132 may be determined based on a comparison of the object properties 118b of the detected object 118a to previously determined characteristics of predefined objects stored in the object repository 134, as described in greater detail above with respect to FIG. 1. In some cases, if the object probability 132 is high (e.g., greater than a threshold 166), the action-based detection system may determine that the object 118a is very likely a synthetic media object and chronological analysis (e.g., of steps 212-216 may not need to be performed). However, in typical embodiments, chronological analysis is still performed to help ensure that well-designed synthetic media objects that have properties 118b similar to those of their real-world counterparts do not go undetected.

At step 212, a chronological natural language description 140 is determined for the video 146 (e.g., or the portion of the video 146 that has been received for analysis via frame group buffer 110). The chronological description 140 includes a narrative of the actions 122 occurring with each detected object 118a throughout the portion of the video 146 that is provided in the frame group buffer 110 for analysis. At step 214, the chronological description 140 is compared to one or more reference descriptions in the action description repository 168. The action description repository 168 stores natural language descriptions of actions that are known to be possible to occur with real-world objects. These references may indicate actions that are possible and/or impossible for certain objects 118a or classes of objects 118a in the real world. For example, a smartphone class object 118a is capable of falling if dropped but cannot float or glide to a soft landing. This type of information is captured by the action description repository 168 and used for comparison to the chronological description 140.

At step 216, the overall probability 164 that an object 118a is a synthetic media object is determined based on the comparison at step 214. For example, the comparison from step 214 may indicate whether the chronological description 140 includes actions 122 for an object 118a that can occur in the real world with the object 118a. For example, certain objects may not be capable of independent movement, while other objects are capable of certain types of independent movement. These characteristics are captured by the references in the action description repository 168. If an object 118a is indicated in the chronological description 140 to be involved with an action 122 that is not appropriate or possible for that object 118a in the real world, then the overall probability 164 that the object 118a is synthetic media is increased. Any appropriate method of natural language processing and/or an appropriately trained machine learning algorithm may be used to determine the overall probability 164.

At step 218, the media presentation device 106 displays the overall probability 164 with the video 146, as described above with respect to FIG. 1. In some cases, a selectable toggle button 148 can be adjusted via a user input to prevent or allow display of the overall probability 164. In some cases, the selection at toggle button 148 may impact how/ whether the overall probability 164 is determined, providing further improvements in the efficiency with which computational resources are used to determine the overall probability 164 and/or the speed at which the overall probability 164 can be determined. For example, when the toggle button 148 is adjusted to prevent display of the overall probability 164, the action-based detection system 112 may at least temporarily stop determining the overall probability 164, such that computing resources are not expended when display of the overall probability 164 is not requested. However, in other cases (e.g., when it is desirable to have near instant access to the overall probability 164 when it is requested), when the toggle button 148 is adjusted to prevent display of the overall probability 164, the action-based detection system 112 continues determining the overall probability 164, such that the overall probability 164 is immediately or nearly immediately available when the toggle button 148 is subsequently selected to allow presentation of the overall probability 164.

At step 220, the action-based detection system 112 determines whether overall probability 164 is less than a threshold 166. If this is the case, the action-based detection system 112 may decrease the rate or frequency at which data is provided in the frame group buffer 110 at step 222. In other words, the action-based detection system 112 may select the portion of the media stream 104 to receive in frame group buffer 110 based at least in part on the overall probability 164. When the overall probability 164 is relatively low (e.g., less than threshold 166), a reduced portion of the media stream 104 is received to reduce consumption of processing resources by the action-based detection system when there is a low initial likelihood of synthetic media. If the overall probability 164 increases (e.g., as more frames of the video 146 are analyzed), the data provided in the frame group buffer 110 can be increased to improve synthetic media detection in subsequent portions (e.g., frames or time points) of the video 146.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
   a memory configured to store:
      an object repository comprising a plurality of previously determined characteristics of an object; and
      a plurality of descriptions of possible actions associated with the object;
   a processor communicatively coupled to the memory and configured to:
      receive a media stream comprising a plurality of portions of a video to be presented on a media player device;
      electronically extract a first portion of the plurality of portions from the media stream;
      include, based at least in part upon a previous probability for synthetic objects in the media stream, the first portion of the media stream in a frame group buffer, wherein:
         the frame group buffer comprises more data when the previous probability for synthetic objects in the media stream is above a threshold; and
         the frame group buffer comprises less data when the previous probability for the synthetic objects in the media stream is below the threshold;
      detect the object in the first portion of the media stream;
      electronically retrieve a plurality of object properties associated with the object in the first portion of the media stream;
      identify, appearing in the first portion of the media stream, an action associated with the object;
      compare the plurality of object properties to the plurality of previously determined characteristics of the object;
      assign a probability that the object in the first portion of the media stream is artificially included in the video to resemble the object based on a comparison of the plurality of object properties to the plurality of previously determined characteristics of the object;
      generate a chronological description of a plurality of actions associated with the object in the video;
      electronically verify whether the chronological description of the plurality of actions associated with the object in the video matches the plurality of descriptions of the possible actions associated with the object;
      in response to electronically verifying that the chronological description of the plurality of actions associated with the object in the video do not match the plurality of descriptions of the possible actions associated with the object, delay provisioning of the media stream to the media player device;
      determine that the chronological description of the plurality of actions associated with the object in the video includes actions that cannot occur in association with the object in the video;
      in response to determining that the chronological description of the plurality of actions associated with the object in the video includes actions that cannot occur in association with the object in the video, assign a refined probability that the object is artificially included in the video to resemble the object based at least in part upon a number of actions that cannot occur in association with the object in the video;
      verify whether the refined probability is greater than a threshold, the refined probability being an updated version of the probability;
      in response to electronically verifying that the refined probability is greater than the threshold, flag that the object within the first portion of the media stream is synthetic, a flagged version of the object in the first portion of the media stream comprising a visual indicator that the object is synthetic;
      electronically interpolate the flagged version of the object into the first portion of the media stream; and transmit, to the media player device, the first portion of the media stream in the frame group buffer, the first portion comprising the flagged version of the object; and the media player device comprising a screen configured to display the flagged version of the object in the first portion of the media stream along the refined probability, wherein the media player device displays the first portion of the media stream preceded by the delay.

2. The system of claim 1, wherein the processor is further configured to:

select the first portion of the media stream to receive based at least in part upon the refined probability, wherein when the refined probability is less than a threshold value, a reduced portion of the media stream is received to reduce consumption of processing resources.

3. The system of claim 1, wherein the plurality of object properties comprise one or more of a size of the object, a color of the object, a logo appearing on the object, text appearing on the object, and an object class of the object.

4. The system of claim 1, wherein the media player device is further configured to:

provide a selectable toggle button configured to block or allow display of the refined probability.

5. The system of claim 4, wherein the processor is further configured to:

when the selectable toggle button is adjusted to block display of the refined probability, at least temporarily stop determining the refined probability, such that computing resources are not expended when display of the refined probability is not requested.

6. The system of claim 4, wherein the processor is further configured to:

when the selectable toggle button is adjusted to block display of the refined probability, continue determining the refined probability, such that the refined probability is immediately available when the selectable toggle button is subsequently selected to allow presentation of the refined probability.

7. The system of claim 1, wherein the processor is further configured to determine the chronological description of the actions associated with the object using a method of natural language processing.

8. A method comprising:

receiving a media stream comprising a plurality of portions of a video to be presented on a media player device;

electronically extracting a first portion of the plurality of portions from the media stream;

including, based at least in part upon a previous probability for synthetic objects in the media stream, the first portion of the media stream in a frame group buffer, wherein:

the frame group buffer comprises more data when the previous probability for synthetic objects in the media stream is above a threshold; and the frame group buffer comprises less data when the previous probability for the synthetic objects in the media stream is below the threshold;

detecting an object in the first portion of the media stream;

electronically retrieving a plurality of object properties associated with the object in the first portion of the media stream;

identifying, appearing in the first portion of the media stream, an action associated with the object;

comparing the plurality of object properties to a plurality of previously determined characteristics of the object;

assigning a probability that the object in the first portion of the media stream is artificially included in the video to resemble the object based on a comparison of the plurality of object properties to the plurality of previously determined characteristics of the object;

generating a chronological description of a plurality of actions associated with the object in the video;

electronically verifying whether the chronological description of the plurality of actions associated with the object in the video matches a plurality of descriptions of possible actions associated with the object;

in response to electronically verifying that the chronological description of the plurality of actions associated with the object in the video do not match the plurality of descriptions of the possible actions associated with the object, delay provisioning of the media stream to the media player device;

determining that the chronological description of the plurality of actions associated with the object in the video includes actions that cannot occur in association with the object in the video;

in response to determining that the chronological description of the plurality of actions associated with the object in the video includes actions that cannot occur in association with the object in the video, assigning a refined probability that the object is artificially included in the video to resemble the object based at least in part upon a number of actions that cannot occur in association with the object in the video;

verifying whether the refined probability is greater than a threshold, the refined probability being an updated version of the probability;

in response to electronically verifying that the refined probability is greater than the threshold, flagging that the object within the first portion of the media stream is synthetic, a flagged version of the object in the first portion of the media stream comprising a visual indicator that the object is synthetic;

electronically interpolating the flagged version of the object into the first portion of the media stream;

transmitting, to the media player device, the first portion of the media stream in the frame group buffer, the first portion comprising the flagged version of the object; and displaying, using the media player device comprising a screen, the flagged version of the object in the first portion of the media stream along the refined probability, wherein the media player device displays the first portion of the media stream preceded by the delay.

9. The method of claim 8, further comprising:

selecting the first portion of the media stream to receive based at least in part upon the refined probability, wherein when the refined probability is less than a threshold value, a reduced portion of the media stream is received to reduce consumption of processing resources.

10. The method of claim 8, wherein the plurality of object properties comprise one or more of a size of the object, a color of the object, a logo appearing on the object, text appearing on the object, and an object class of the object.

11. The method of claim 8, further comprising providing a selectable toggle button configured to block or allow displaying of the refined probability.

12. The method of claim 11, further comprising:
when the selectable toggle button is adjusted to block displaying of the refined probability, at least temporarily stopping determination of the refined probability, such that computing resources are not expended when displaying of the refined probability is not requested.

13. The method of claim 11, wherein, when the selectable toggle button is adjusted to block display of the refined probability, continuing to determine the refined probability, such that the refined probability is immediately available when the selectable toggle button is subsequently selected to allow presentation of the refined probability.

14. The method of claim 8, further comprising:
determining the chronological description of the actions associated with the object using a natural language processing process.

15. A non-transitory computer-readable medium storing instructions that when executed by a processor cause the processor to:
receive a media stream comprising a plurality of portions of a video to be presented on a media player device;
electronically extract a first portion of the plurality of portions from the media stream;
include, based at least in part upon a previous probability for synthetic objects in the media stream, the first portion of the media stream in a frame group buffer, wherein:
the frame group buffer comprises more data when the previous probability for synthetic objects in the media stream is above a threshold; and
the frame group buffer comprises less data when the previous probability for the synthetic objects in the media stream is below the threshold;
detect an object in the first portion of the media stream;
electronically retrieve a plurality of object properties associated with the object in the first portion of the media stream;
identify, appearing in the first portion of the media stream, an action associated with the object;
compare the plurality of object properties to a plurality of previously determined characteristics of the object;
assign a probability that the object in the first portion of the media stream is artificially included in the video to resemble the object based on a comparison of the plurality of object properties of the plurality of object properties to the plurality of previously determined characteristics of the object;
generate a chronological description of a plurality of actions associated with the object in the video;
electronically verify whether the chronological description of the plurality of actions associated with the object in the video matches a plurality of descriptions of possible actions associated with the object;
in response to electronically verifying that the chronological description of the plurality of actions associated with the object in the video do not match the plurality of descriptions of the possible actions associated with the object, delay provisioning of the media stream to the media player device;
determine that the chronological description of the plurality of actions associated with the object in the video includes actions that cannot occur in association with the object in the video;
in response to determining that the chronological description of the plurality of actions associated with the object in the video includes actions that cannot occur in association with the object in the video, assign a refined probability that the object is artificially included in the video to resemble the object based at least in part upon a number of actions that cannot occur in association with the object in the video;
verify whether the refined probability is greater than a threshold, the refined probability being an updated version of the probability;
in response to electronically verifying that the refined probability is greater than the threshold, flag that the object within the first portion of the media stream is synthetic, a flagged version of the object in the first portion of the media stream comprising a visual indicator that the object is synthetic;
electronically interpolate the flagged version of the object into the first portion of the media stream;
transmit, to the media player device, the first portion of the media stream in the frame group buffer, the first portion comprising the flagged version of the object; and
display, using the media player device comprising a screen, the flagged version of the object in the first portion of the media stream along the refined probability, wherein the media player device displays the first portion of the media stream preceded by the delay.

16. The non-transitory computer-readable medium of claim 15, wherein, when executed by the processor, the instructions further cause the processor to:
select the first portion of the media stream to receive based at least in part on the refined probability, wherein when the refined probability is less than a threshold value, a reduced portion of the media stream is received to reduce consumption of processing resources.

17. The non-transitory computer-readable medium of claim 15, wherein the plurality of object properties of the object comprises one or more of a size of the object, a color of the object, a logo appearing on the object, text appearing on the object, and an object class of the object.

18. The non-transitory computer-readable medium of claim 15, wherein, when executed by the processor, the instructions further cause the processor to:
provide a selectable toggle button configured to block or allow display of the refined probability.

19. The non-transitory computer-readable medium of claim 18, wherein, when executed by the processor, the instructions further cause the processor to:
when the selectable toggle button is adjusted to block display of the refined probability, at least temporarily stop determining the refined probability, such that computing resources are not expended when display of the refined probability is not requested.

20. The non-transitory computer-readable medium of claim 18, wherein, when executed by the processor, the instructions further cause the processor to:
when the selectable toggle button is adjusted to block display of the refined probability, continue determining the refined probability, such that the refined probability is immediately available when the selectable toggle button is subsequently selected to allow presentation of the refined probability.

* * * * *